US009051009B2

(12) United States Patent
Prohaska

(10) Patent No.: US 9,051,009 B2
(45) Date of Patent: Jun. 9, 2015

(54) STEERABLE TRACK SYSTEM

(76) Inventor: James B. Prohaska, Prior Lake, MN (US)

( * ) Notice: Subject to any disclaimer, the term of this patent is extended or adjusted under 35 U.S.C. 154(b) by 444 days.

(21) Appl. No.: 13/504,369

(22) PCT Filed: Oct. 27, 2010

(86) PCT No.: PCT/US2010/054298
§ 371 (c)(1),
(2), (4) Date: Apr. 26, 2012

(87) PCT Pub. No.: WO2011/056656
PCT Pub. Date: May 12, 2011

(65) Prior Publication Data
US 2012/0212045 A1    Aug. 23, 2012

Related U.S. Application Data

(60) Provisional application No. 61/279,860, filed on Oct. 27, 2009.

(51) Int. Cl.
*B62D 11/22*    (2006.01)
*B62D 55/104*    (2006.01)
*B62D 55/14*    (2006.01)
*B62D 55/20*    (2006.01)
*B62D 55/215*    (2006.01)
*B62D 55/30*    (2006.01)

(52) U.S. Cl.
CPC .............. *B62D 11/22* (2013.01); *B62D 55/104* (2013.01); *B62D 55/14* (2013.01); *B62D 55/20* (2013.01); *B62D 55/202* (2013.01); *B62D 55/215* (2013.01); *B62D 55/30* (2013.01)

(58) Field of Classification Search
CPC ...... B62D 55/20; B62D 55/104; B62D 55/14; B62D 55/22; B62D 55/202; B62D 55/30; B62D 55/215; B62D 11/22
USPC ......... 305/124, 127, 128, 129, 130, 131, 132, 305/135, 141, 142, 159, 160, 185, 40, 41, 305/44, 45
See application file for complete search history.

(56) References Cited

U.S. PATENT DOCUMENTS

| | | | | | |
|---|---|---|---|---|---|
| 754,409 | A | * | 3/1904 | Beckwith | 180/9.44 |
| 1,480,692 | A | * | 1/1924 | Rackham | 305/132 |
| 3,548,962 | A | * | 12/1970 | Best | 180/9.44 |
| 4,059,314 | A | * | 11/1977 | Amstutz | 305/154 |
| 5,273,126 | A | * | 12/1993 | Reed et al. | 180/9.21 |
| 6,116,362 | A | * | 9/2000 | Schubert et al. | 180/9.44 |
| 6,547,345 | B2 | * | 4/2003 | Phely | 305/124 |

FOREIGN PATENT DOCUMENTS

DE         170248 A      4/1906

OTHER PUBLICATIONS

International Search Report, mailed Dec. 27, 2010.

* cited by examiner

*Primary Examiner* — S. Joseph Morano
*Assistant Examiner* — Jean Charleston
(74) *Attorney, Agent, or Firm* — Kinney & Lange, P.A.

(57) ABSTRACT

A steerable track system for steering a vehicle with a main frame and a track includes an undercarriage with pivoting links connected to the main frame; a bendable flexible track to provide a vehicle-surface interface for propelling the vehicle; a plurality of idler wheels which engage the track and are connected to the undercarriage; and a plurality of bogie wheels which engage the track and are connected to the undercarriage.

39 Claims, 7 Drawing Sheets

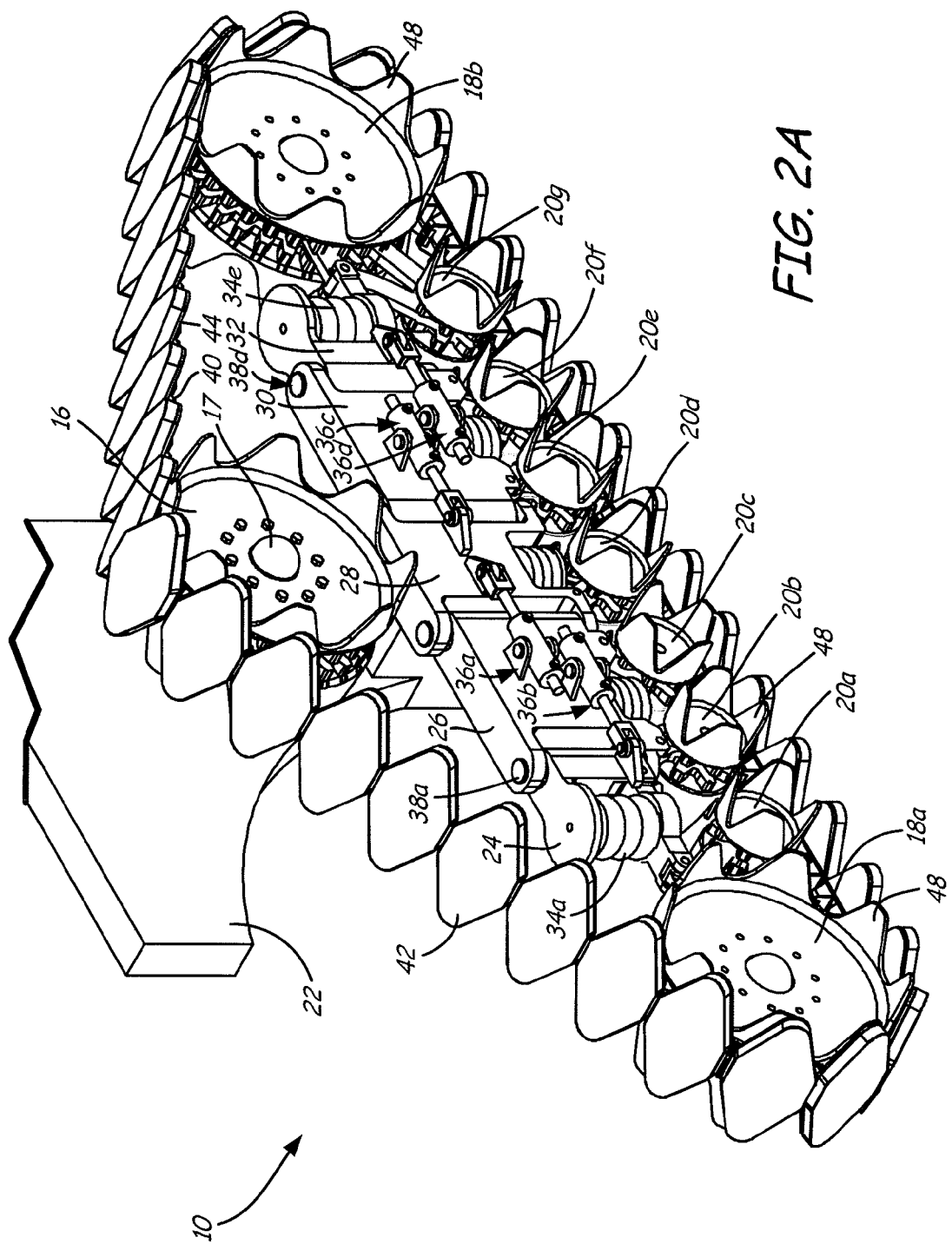

STEERABLE TRACK SYSTEM

CROSS-REFERENCE TO RELATED APPLICATION(S)

This application claims priority to U.S. Provisional Application No. 61/197,373, filed on Oct. 27, 2008, entitled "Steerable Tracks," and No. 61/279,860, filed on Oct. 27, 2009, entitled "Steerable Tracks" the disclosures of which are incorporated by reference in their respective entireties.

BACKGROUND

Track assemblies are used on a variety of vehicles, including tractors, military vehicles and all terrain vehicles ("ATVs"). Track assemblies allow vehicles to travel on a continuous track, making them able to handle a wider variety of terrain than typical vehicles with four wheels. Additionally, track assemblies can allow vehicles to travel over a terrain and not disturb the terrain compared to some vehicles due to the larger surface area of the tracks to spread out vehicle weight (as compared to the surface area of tires).

On a typical vehicle, two track assemblies are used, one on each side of the vehicle parallel to each other and oriented for forward and reverse travel of the vehicle. The track is generally driven frictionally, although it can be driven in other ways. In some vehicles, a track can simply be fitted over wheels on the vehicle. Tracks are generally thick rubber, either one long band or rectangular cleats. Multiple tension members in the form of steel cables are then generally bonded to the cleats or the band.

Turning a track vehicle is more difficult than turning a typical wheeled vehicle. Track vehicles typically turn through skid steering. Skid steering involves having a different velocity on the track on one side of the vehicle than the track on the other side. This can be accomplished by speeding up the track on one side and/or slowing down the track on the other side. The skidding action requires a large amount of force to turn the vehicle, and it can result in ground surface disturbance and soil berming.

SUMMARY

A steerable track system for steering a vehicle with tracks includes a main frame; an undercarriage with pivoting links connected to the main frame; a bendable flexible track to provide a vehicle-surface interface for propelling the vehicle; a plurality of idler wheels which engage the track and are connected to the undercarriage; and a plurality of bogie wheels which engage the track and are connected to the undercarriage.

BRIEF DESCRIPTION OF THE DRAWINGS

FIG. 2A is a perspective view of an outer side of the steerable track system of FIG. 1.

DETAILED DESCRIPTION

Figure 1:
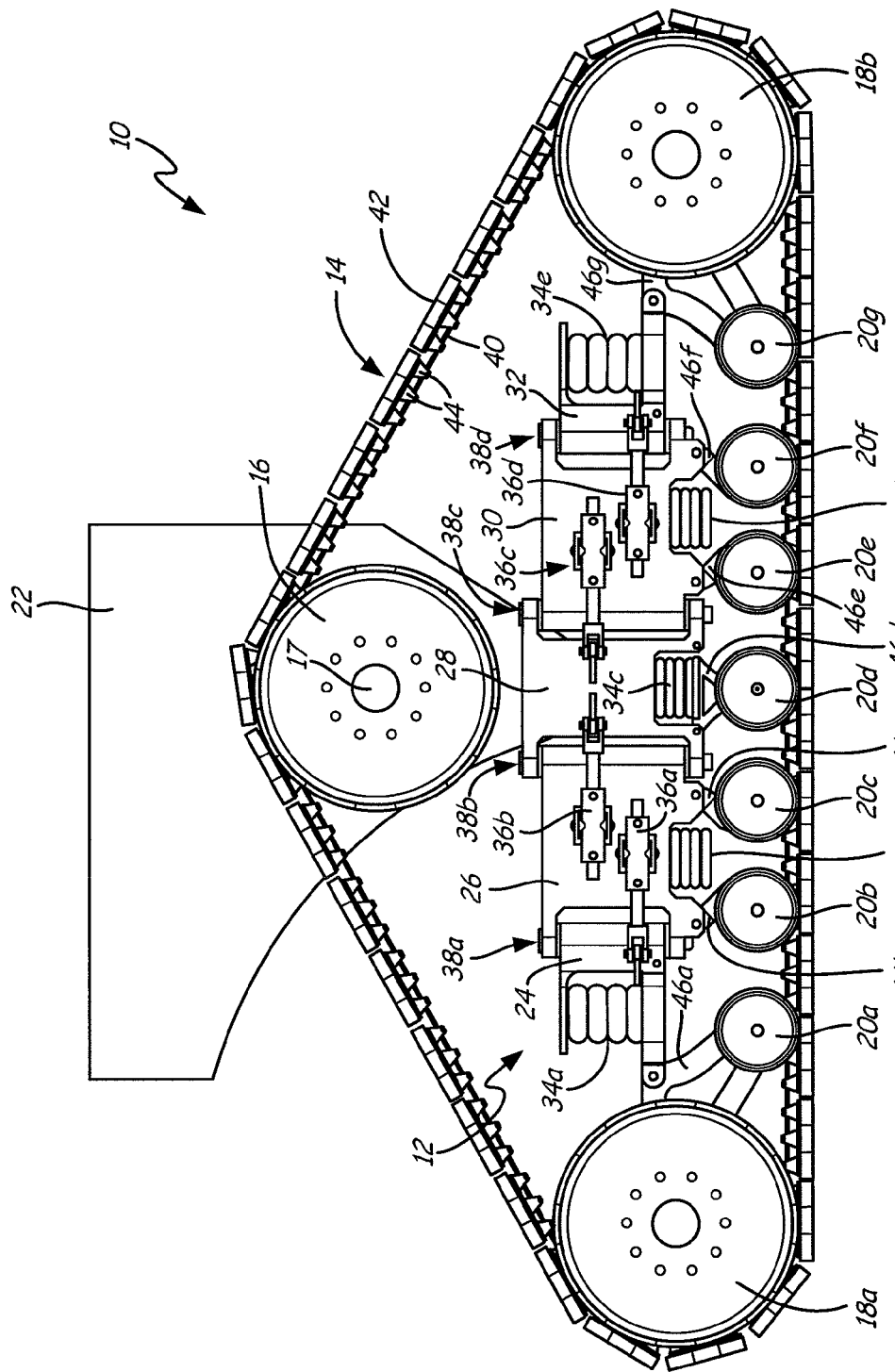
FIG. 1 is a side view of a steerable track system according to the present invention.

FIG. 1 is a side view of a steerable track system 10 according to the present invention which includes steerable undercarriage 12, track 14, drive sprocket 16 with axle 17, idler wheels 18a, 18b, bogie wheels 20a-20g, and vehicle main frame 22. Steerable undercarriage 12 includes links 24, 26, 28, 30, 32, suspension devices 34a-34e, hydraulic cylinders 36a-36d and pivot pins 38a-38d. Track 14 includes flexible tension member 40, cleats 42, and guide lugs 44.

Central link 28 of undercarriage 12 is rigidly fixed to vehicle main frame 22. Links 24, 26, 30, 32 are pivotably connected to each other via pivot pins 38a-38d and hydraulic cylinders 36a-36d. Idler wheels 18a-18b and bogie wheels 20a-20g are connected to undercarriage by suspension links 46a-46g. Cleats 42 are rigidly connected to guide lugs 44. Guide lugs 44 rigidly connect to flexible tension member 40. Track 14 guide lugs 44 are engaged by drive sprocket 16, idler wheels 18a-18b and bogie wheels 20a-20g. Drive sprocket 16 is moveably connected to vehicle main frame 22.

Flexible tension member 40 can be a wire rope or cable that is axially rigid for track tensioning and bendably flexible in all other directions to accommodate steering, track rotation around drive sprocket 16, idler wheels 18a-18b and bogie wheels 20a-20g and suspension movements due to ground undulations. Cleats 42 serve to transfer tractive force from flexible tension member 40 to the ground surface. Cleats 42 are shaped to accommodate bending of the track due to steering and can also be shaped to assist in expelling soil and other debris that may have gotten caught between cleats 42 and idler wheels 18a-18b or bogie wheels 20a-20g in past systems that used rectangular cleats. In this embodiment, cleats 42 are diamond shaped. Cleats 42 can be made of a variety of materials, including steel with rubber bonded to it, urethane over steel or aluminum, or wood with steel, depending on the requirements of the system and available materials. Cleats 42 and guide lugs 44 are removable for individual replacement in case of damage.

Track 14 is driven around idler wheels 18a-18b, and bogie wheels 20a-20g by drive sprocket 16 transferring tractive force to guide lugs 44, which then transfer the force to flexible tension member 40. This causes the vehicle using steerable track system 10 to move relative to the ground surface. Drive sprocket 16 can be powered by any combination of drive train components generally known in the art.

Links 24, 26, 30, 32 can be rotated by hydraulic cylinders 36a-36d which are controlled by a conventional vehicle power steering system. As mentioned before, link 28 is rigidly connected to vehicle main frame 22. Hydraulic cylinders 36a-36d can be double-ended and hydraulically plumbed in a master-slave arrangement to ensure that each link is rotated the same degrees relative to each of the other links to form an arc. Suspension links 46a-46g and suspension devices 34a-34e (which can be springs) provide weight bearing and cushioning for the vehicle. Steering system can be controlled to provide various steering modes, including coordinated steer mode and front steer mode. Coordinated steer mode is generally described above, with pivoting done through all cylinders 36a-36d so that all links (24, 26, 28, 30, 32) form an arc. Coordinated steering systems can be controlled through speed-sensitive controls to allow for the first half to turn first (the links first in the direction of travel, 24, 26) and then the links in the second half (30, 32) to provide minimal or no ground disturbance that may occur when both halves rotate at the same time. In front steer mode, only half of the undercarriage steers, for example, only links 24 and 26 are pivoted.

The half that steers is always the side towards the direction of travel, for example 24, 26 when going forward or 30, 32 when reversing. While this may be desirable to provide more vehicle stability and use less energy than pivoting all links, it generally results in less steering responsiveness and a larger turning radius. Steering system can cause pivoting so that all links 24, 26, 28, 30, 32 form an arc, or can pivot only some links to form an arc if desired.

Suspension links 46a-46g are flexibly mounted to idler wheels 18a-18b and bogie wheels 20a-20g to allow wheels 18a-18b, 20a-20g to oscillate and allow cleats 42 to always operate parallel to the ground surface, minimizing uneven cleat 42 wear. This flexible mounting also allows for compliance to ground undulations by allowing idler wheels 18a-18b and bogie wheels 20a-20g to oscillate about the longitudinal axis of the flexible tension member, keeping the cleats 42 more in contact with the ground to improve tractive effort. Suspension devices 34a-34e can be configured to be individually controlled to provide ride height and spring rate control. Different suspension modes are possible, including distributed mode, traction control mode and road mode. Distributed mode applies a similar downward force on all suspension devices 34a-34e to evenly distribute weight bearing among all idler wheels 18a-18b and bogie wheels 20a-20g. Distributed mode provides the least amount of ground pressure, as it spreads vehicle weight over all cleats 42 touching the ground surface at any time. Traction control mode provides traction control functions by controlling one or more suspension devices 34a-34e to produce additional downward force onto certain bogie wheels 20a-20g or idler wheels 18a-18b and less downward force on the remaining bogie wheels 20a-20g or idler wheels 18a-18b when slippage is detected at cleats 42. This is generally done through a vehicle electronic control system and electronic sensors that compare actual ground speed to theoretical ground speed. The suspension devices can be hydraulic cylinders, airbags or any other means of providing variable downward force. Once slippage is below a preset limit, the vehicle electronic control system can return suspension to distributed mode. Road mode forces idler wheels 18a-18b to carry more weight than bogie wheels 20a-20g by increasing downward force of suspension devices 34a, 34e related to those wheels. Road mode improves vehicle stability in the yaw and pitch directions by ensuring proportionally more vehicle weight is carried farthest away from the center of gravity.

Figure 2B:
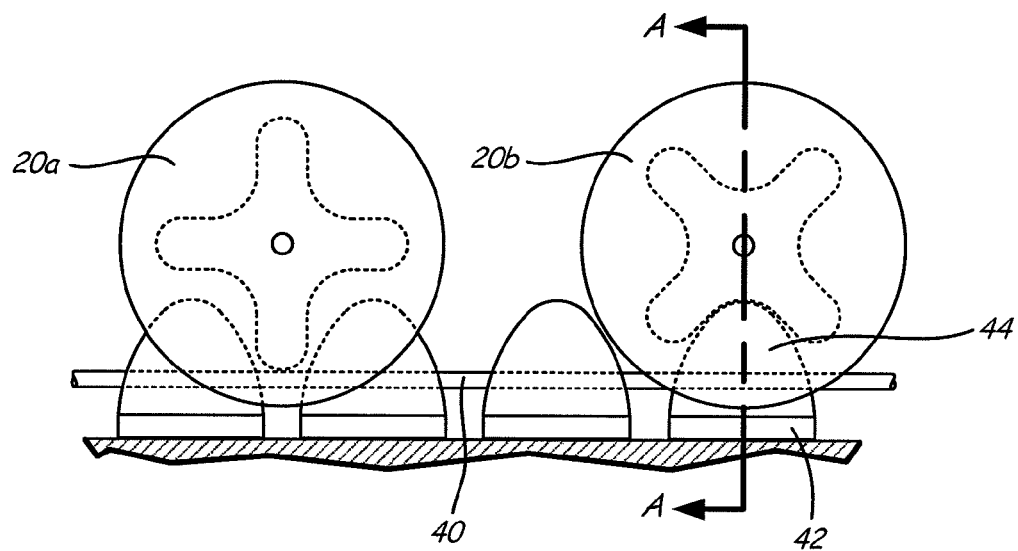
FIG. 2B is a cross sectional view of two bogie wheels of FIG. 2A engaging guide lugs on the track.
Figure 2C:
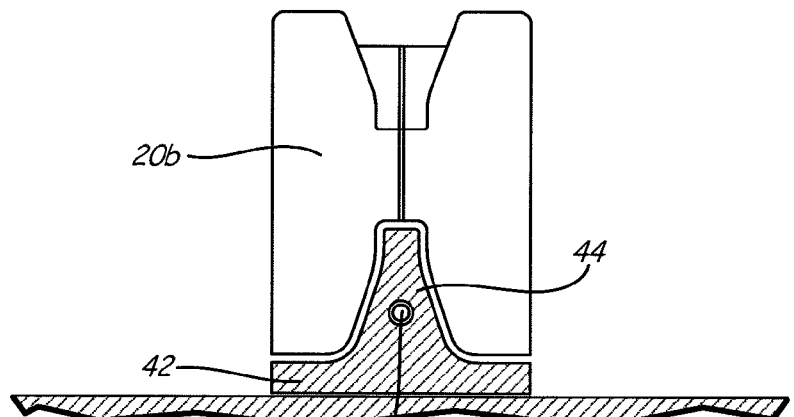
FIG. 2C is a cross-section of FIG. 2B along line A-A.

FIG. 2A is a perspective view of an outer side of the steerable track system of FIG. 1. FIG. 2B is a cross sectional view of two bogie wheels of FIG. 2A engaging guide lugs on the track. FIG. 2C is a cross-section of FIG. 2B along line A-A. Steerable track system 10 includes steerable undercarriage 12 (with links 24, 26, 28, 30, 32, suspension devices 34a-34e, hydraulic cylinders 36a-36d and pivot pins 38a-38d), track 14 (with flexible tension member 40, cleats 42, and guide lugs 44), drive sprocket 16 with axle 17, idler wheels 18a-18b and bogie wheels 20a-20g. As can be seen in this view, drive sprocket 16, idler wheels 18a-18b, and bogie wheels 20a-20g include finger-like extensions 48 which match up with the shape of cleats 42. Additionally, drive sprocket 16, idler wheels 18a-18b and bogie wheels 20a-20g have two symmetrical halves tapered to receive guide lugs 44 and keep track 14 properly engaged to drive sprocket 16, idler wheels 18a-18b and bogie wheels 20a-20g.

Projections 48 are attached around the circumference of idler wheels 18a-18b, bogie wheels 20a-20g and drive sprocket 16. They can be integral to idler wheels 18a-18b, bogie wheels 20a-20g and drive sprocket 16 or could be securely attached by any appropriate means, such as welding. Projections 48 are shaped and aligned to distribute weight from the vehicle (and any load the vehicle may be carrying) evenly over the entire cleat 42. By distributing the weight evenly through projections 48, the vehicle is able to cause less disturbance and compaction to the surface on which it is travelling.

FIGS. 2B and 2C show how bogie wheels 20a-20b engage drive track 14 through guide lugs 44 and flexible tension member 40. As can be seen, guide lugs 44 are engaged by bogie wheels 20a-20b to keep track 14 properly aligned to transfer weight of the vehicle to the ground surface. Downward force is carried on cleat 42 as bogie wheel 20b rolls across cleat 42, and the downward force is carried on flexible tension member 40 as a bogie wheel 20a rolls from one cleat 42 to the next cleat 42. As can be seen in FIG. 2C, flexible tension member 40 is positioned above the rolling surface of cleat. This placement ensures that guide lug 44 stays engaged to bogie wheel 20b and prevents de-tracking in the event of side forces due to track tension during steering, sidehill operation, or foreign objects on the ground. Additionally, the V-shape between the parallel sides of bogie wheel 20b helps to properly center track 14 for secure engagement between bogie wheels 20b and guide lug 44 even in turning situations.

Figure 3:
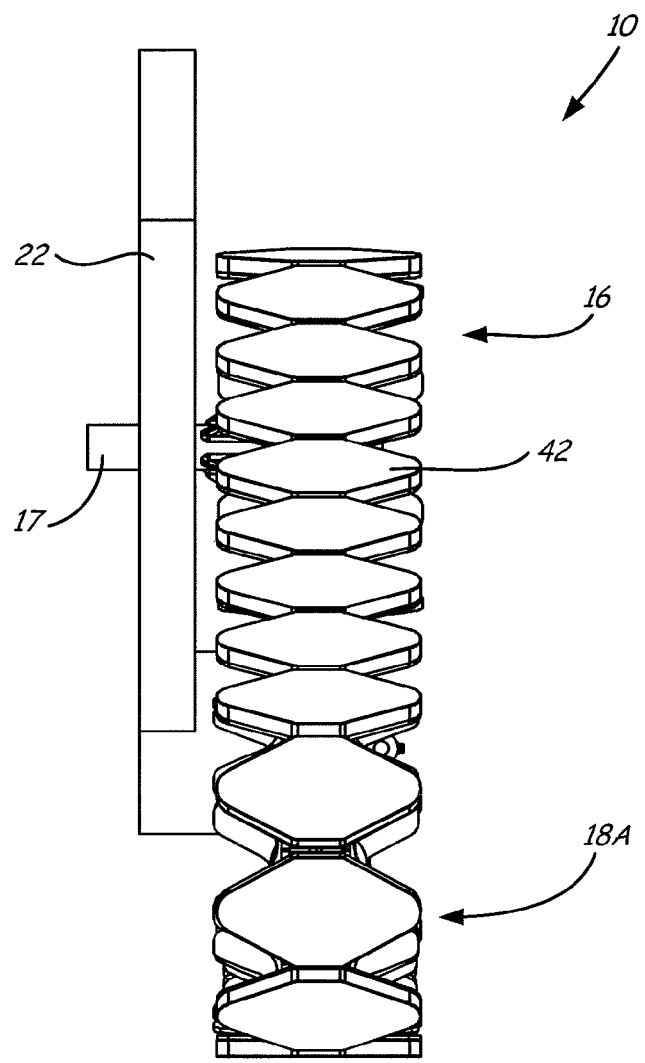
FIG. 3 shows a front view of the steerable track system of FIG. 1

FIG. 3 shows a front view of the steerable track system 10 of FIG. 1, and includes vehicle main frame 22, track 14 with cleats 42 and axle 17. Tracks travel around drive sprocket 16, idler wheels 18a-18b, and bogie wheels 20a-20g to propel the vehicle relative to the surface on which it sits. As can be seen in this view, cleats 42 bend as they travel around drive sprocket 16 and idler wheel 18a. The bending is possible due to the shape of cleats 42 and the flexible tension member (not shown) connecting them.

The ability to easily bend when travelling around drive sprocket 16, idler wheels 18a-18b, and bogie wheels 20a-20g, makes the track of the current invention able to easily travel around the drive sprocket 16, idler wheels 18a-18b, and bogie wheels 20a-20g and propel the vehicle without having to use as much energy as past systems required. Past track systems generally had a track that was either one large, flat belt or consisted of rectangular cleats connected by a plurality of steel pins. Past track systems were bendable only in the direction so as to allow rotation of the track around the drive sprocket, idler wheels, and bogie wheels. Due to the size and shape of these tracks, they required large amounts of energy to drive them around the idler wheels and bogie wheels (and thereby propel the vehicle). This was due to the increase in force needed to bend a plurality of steel cables and rectangular cleats next to each other. This increase in force required an increase in fuel to power the system to drive the track. The track of the current invention can travel more easily around the drive sprocket 16, idler wheels 18a-18b and bogie wheels 20a-20g due to its single flexible tension member 40 and the shape of cleats 42, therefore requires less energy and less fuel to operate than past track systems.

Figure 4A:
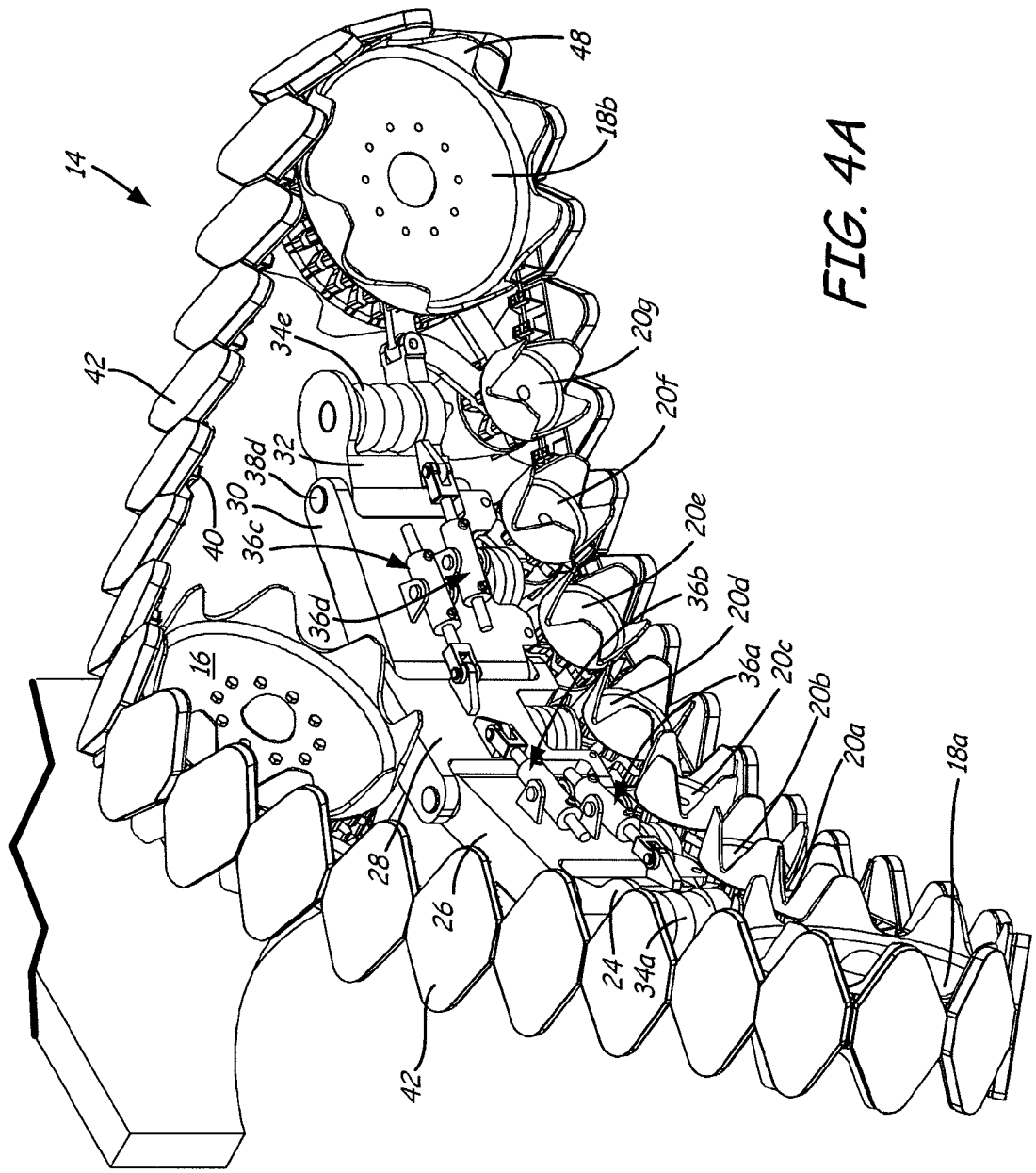
FIG. 4A is a perspective view of a steerable track system according to the present invention with undercarriage links in a pivoted state to turn a vehicle.
Figure 4B:
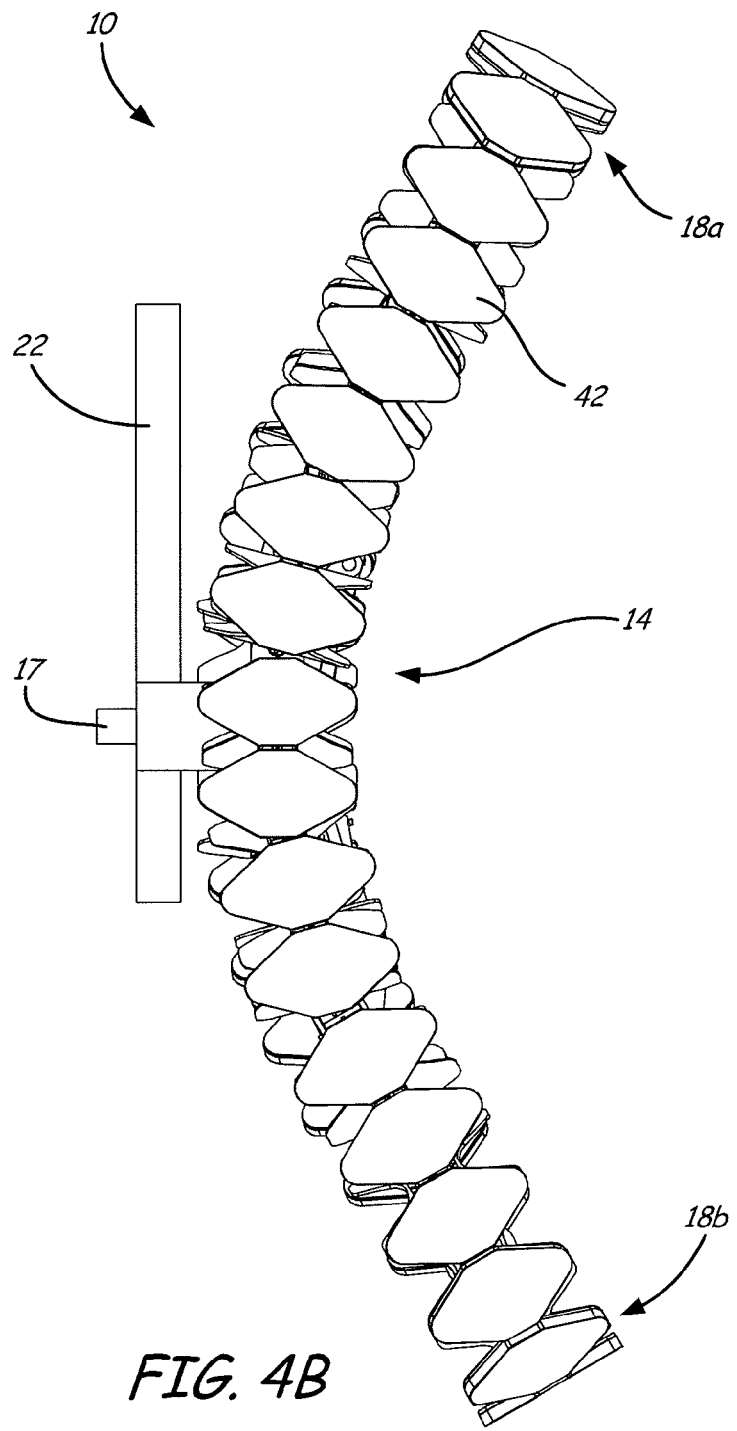
FIG. 4B is a bottom view of FIG. 4A.

FIG. 4A is a perspective view of a steerable track system according to the present invention with undercarriage links in a pivoted state to turn a vehicle. FIG. 4B is a bottom view of FIG. 4A. Steerable track system 10 includes steerable undercarriage 12 with links 24, 26, 28, 30, 32, suspension devices 34a-34e, hydraulic cylinders 36a-36d, and pivot pins 38a-38d; track 14 with flexible tension member 40, cleats 42, and guide lugs 44; drive sprocket 16 with axle 17, idler wheels 18a-18b, bogie wheels 20a-20g and projections 48.

FIGS. 4A and 4B show links 24, 26, 28, 30, 32 of steerable undercarriage 12 pivoted in an arc formation to turn the vehicle. The pivot is controlled through the steering system of the vehicle which controls hydraulic cylinders 36a-36d to pivot links 24, 26, 30, 32. The amount of pivot can be large or small depending on the turn radius desired, the velocity the vehicle is travelling, the vehicle itself, and the terrain on which the vehicle is travelling as well as other factors. Control of the pivot can be automatic as well. For example, if the vehicle is travelling above a certain speed, the steering system may permit a smaller pivot resulting in wider turns than if the vehicle were travelling at a lower speed. Additionally, the system can be controlled to pivot only the front two links (24, 26) or only the back two (30, 32) in situations where that may be desirable (such as when travelling in reverse).

Other embodiments of the steerable track system according to the present invention may include more links or fewer links to control the steering of the vehicle. For example, an alternative embodiment could only have links 24, 26 in the front of the vehicle, with a rigid attachment at the rear instead of links 30, 32 (or vice versa).

By controlling the undercarriage pivot links, the steerable track system of the current invention provides a vehicle with better control during turning, more flexibility in the turns it can make, and helps to prevent soil berming associated with skid steering systems. The prevention of soil berming is especially useful when the steerable tracks system of the current invention is used with tractors, as soil berming can make fields rough resulting in decreased production areas and more difficult terrain for other vehicle. Additionally, the use of specially shaped cleats 42 and flexible tension member 40 allow the track to easily conform to the arc formed by the pivoting links. Cleats 42 are shaped to allow turning, and central flexible tension member 40 and guide lugs 44 ensure that track 14 stays in proper alignment with idler wheels 18a-18b and bogie wheels 20a-20g even when links 24, 26, 30, 32 are pivoted for vehicle turning.

Figure 5:
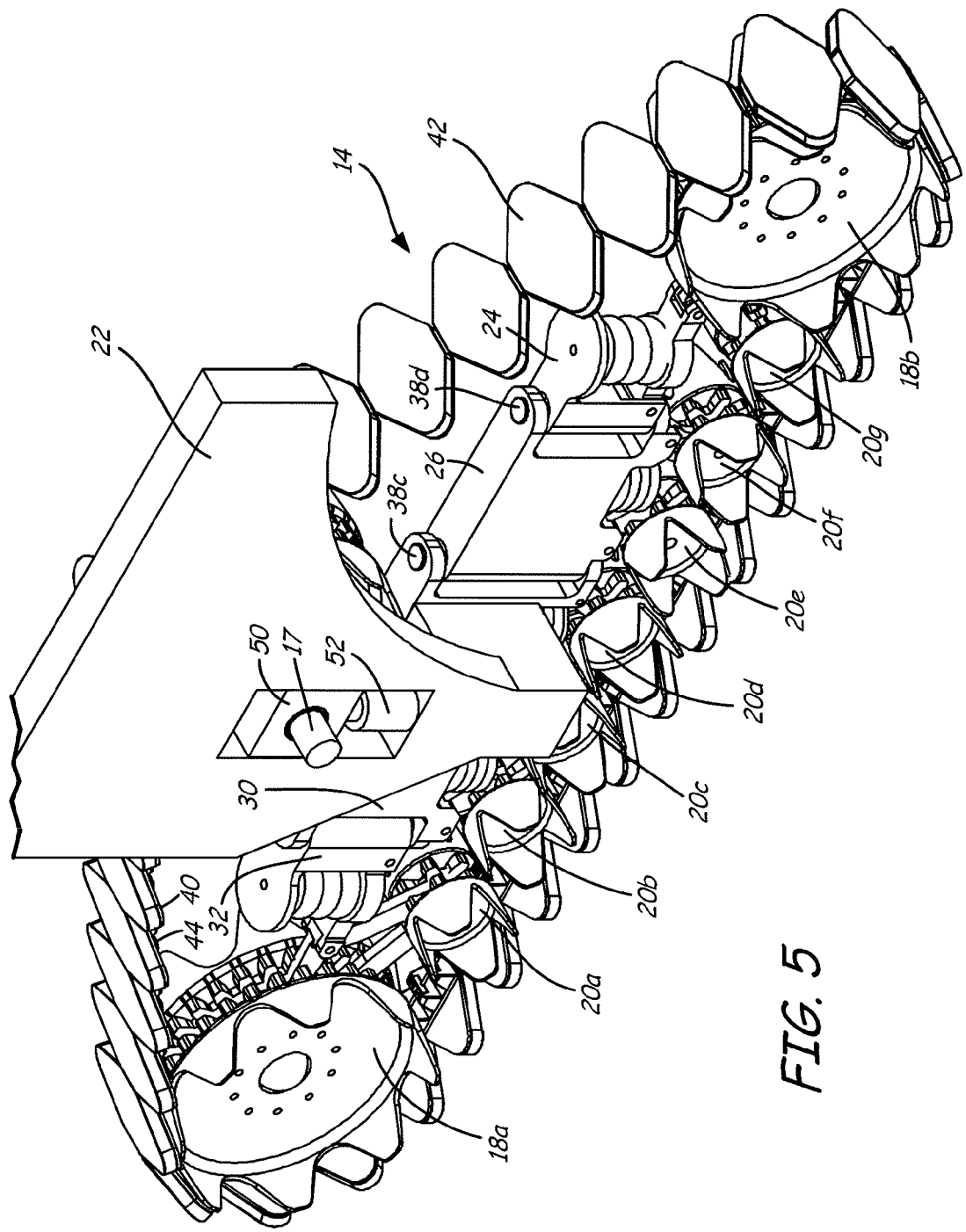
FIG. 5 is a perspective view of an inner side of the steerable track system of FIG. 1.

FIG. 5 is a perspective view of an inner side of the steerable track system of FIG. 1. Steerable track system 10 includes steerable undercarriage 12 (with links 24, 26, 28, 30, 32, suspension devices 34a-34e and pivot pins 38a-38d), track 14 (with flexible tension member 40, cleats 42, and guide lugs 44), idler wheels 18a-18b, bogie wheels 20a-20g, projections 48, drive sprocket 16 with axle 17, slide block 50 and hydraulic cylinder 52 connected to vehicle main frame 22.

Drive sprocket 16 is mounted on slide block 50. The position of slide block 50 is controlled by hydraulic cylinder 52 anchored to main frame 22 and connected to slide block 50.

As mentioned above, drive sprocket 16 is rotated by axle 17 to transmit power to track 14, causing the vehicle to move. To be able to transmit power to track 14 and move the vehicle, track 14 must be held in tension around drive sprocket 16, idler wheels 18a-18b and bogie wheels 20a-20g. This is accomplished by using hydraulic cylinder 52 to move slide block 50 up or down, causing drive sprocket 16 to move up or down to maintain optimal track 14 tension levels. Hydraulic cylinder 52 can be automatically or manually controlled.

By being able to move drive sprocket 16 up or down (through the use of hydraulic cylinder 52 and slide block 50) to control tension in track 14 (and particularly in flexible tension member 40), track assembly is better able to move a vehicle over a surface without disturbing the surface, resulting in less wear on the track system than in past track assembly vehicles. The tensioning system also ensures that track 14 stays properly aligned relative to idler wheels 18a, 18b and bogie wheels 20a-20g, even in turning situations. For example, when the steerable track system 10 is turning (FIGS. 4A-4B), track 14 would have slightly less track 14 on the ground to accommodate the arc from pivoting links 24, 26, 30, 32. To keep optimal tension levels on flexible tension member 40 when links 24, 26, 30, 32 pivot, cylinder 52 could raise slide block 50 (thereby raising drive sprocket 16) to maintain tension in flexible tension member 40. Conversely, when the vehicle is transitioning out of a turn (links are going from pivoted back to straight), cylinder 52 could move slide block 50 and drive sprocket 16 up to maintain tension in flexible tension member 40, ensuring track 14 stays on drive sprocket 16, idler wheels 18a, 18b and bogie wheels 20a-20g without slacking. This movement allows steerable track system 10 to maintain optimal track tension levels for vehicle performance. Additionally, when the vehicle is not in use, cylinder 52 could lower slide block 50 so that little to no tension is put on track 14 when not in use. This can result in an extended lifespan for the track due to less stretching of the flexible tension member 40 when not in use.

While a slide block attached to a hydraulic cylinder is shown in this embodiment for track tensioning, other methods of ensuring proper tension is maintained can be used. For example, a swing arm could be used. The swing arm could be pivotally attached to the main frame on one end and attached to the drive sprocket on the other. The end attached to the drive sprocket could be moved up or down by a hydraulic cylinder, therefore increasing or decreasing tension in the track.

In summary, through the use of an undercarriage with pivoting links, a suspension system and an adjustable, bendable, flexible track, the steerable track system of the current invention allows more flexibility for a track vehicle to travel over a variety of ground surfaces and improves the turning and control of track vehicles. The flexible track allows for a reduction in berming and a reduction in soil compaction as compared to past systems. Additionally, the ability to replace individual damaged cleats is more economical than past systems where the entire track would need replaced when any cleat or part of it was damaged. The shape of the cleats and the single tension flexible member on the track make the track lighter and more flexible, therefore requiring less power to operate and resulting in fuel savings for the overall vehicle.

While the embodiments shown show five links in the steerable tracks system, any number of links could be used depending on the requirements for the system. While the pivoting system for links 24, 26, 30, 32 was shown as hydraulic cylinders, the links could be rotated by rotary or electric actuators. Additionally, while the embodiments shown drove the track through a drive sprocket connected to the main frame, the track could be driven by one of the idler wheels 18a, 18b or the steerable track system could even be on a free-rolling cart with no driving force. In alternative embodiments, the system could include track guides positioned between the idler wheels and the drive sprocket to guide the track onto the idler wheel and drive sprocket, preventing de-tracking and track flopping as the track moves between the drive sprocket and idler wheels.

While the invention has been described with reference to exemplary embodiments, it will be understood by those skilled in the art that various changes may be made and equivalents may be substituted for elements thereof without departing from the scope of the invention. For example, cleats may be a different shape, such as a boomerang shape or another shape which provides a ground engaging surface and can be connected to a single flexible member and allow for turning. They may also include knobs or other extra tractive projections. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A steerable track system for propelling a vehicle with a main frame relative to a surface, the system comprising:
   an undercarriage with a plurality of pivoting links connected to each other via pivot pins, wherein one pivoting link is connected to the main frame;
   a track to provide a vehicle-surface interface for propelling the vehicle;
   a plurality of idler wheels which engage the track and are connected to the undercarriage;
   a plurality of bogie wheels which engage the track and are connected to the undercarriage; and
   a drive sprocket to engage and drive the track around the idler wheels and the bogie wheels causing the vehicle to move in relation to the ground.

2. The system of claim 1, wherein the bendable flexible track comprises:
   a plurality of cleats shaped and positioned so that the track can bend and flex as it travels around the idler wheels, the bogie wheels and the drive sprocket and allow for turning when the links pivot, and with each cleat including a guide lug to engage the idler wheels, bogie wheels and drive sprocket; and
   a flexible tension member to engage the guide lugs of the cleats to hold the plurality of cleats together in a circular track.

3. The system of claim 2, wherein each idler wheel and bogie wheel have two symmetrical halves tapered to receive the guide lugs.

4. The system of claim 2, and further comprising:
   a suspension system with a plurality of suspension devices and suspension links.

5. The system of claim 4, wherein the plurality of idler wheels and bogie wheels flexibly attach to suspension links so that the plurality of idler wheels and bogie wheels can oscillate about the longitudinal axis of the flexible tension member.

6. The system of claim 4, wherein the suspension devices flexibly mount to the suspension links.

7. The system of claim 6, wherein the suspension system further comprises one or more additional suspension devices to increase the downward force on one or more bogie wheels or idler wheels.

8. The system of claim 7, wherein downward force is increased on one or more bogie wheels or idler wheels when slippage is detected.

9. The system of claim 7, wherein downward force is increased on the idler wheels to cause them to carry more vehicle weight.

10. The system of claim 1, wherein the drive sprocket is able to move to increase or decrease tension on the track traveling around the idler wheels, the bogie wheels and the drive sprocket.

11. The system of claim 10, wherein the drive sprocket is moved by a hydraulic cylinder that moves a slide block attached to the drive sprocket.

12. The system of claim 1, wherein the pivoting links are controlled through hydraulic cylinders.

13. The system of claim 12, wherein the hydraulic cylinders are controlled through a vehicle steering system.

14. The system of claim 2, and further comprising:
   a plurality of projections around the circumference of each idler wheel, bogie wheel and the drive sprocket to transfer vehicle weight to the entire surface area of each cleat as it travels around the idler wheels and under the bogie wheels and in moving the vehicle in relation to the ground.

15. The system of claim 2, wherein each track cleat is in a diamond shape.

16. The system of claim 1, wherein the pivoting links can be controlled by the steering system to pivot all links causing the vehicle to turn.

17. The system of claim 1, wherein the pivoting links can be controlled by the steering system to pivot only some of the links to cause the vehicle to turn.

18. The system of claim 1, wherein the number of pivoting links pivoted for steering is automatically controlled based on operating conditions at the time of steering.

19. A steerable track system for steering a vehicle with a main frame and a track, the system comprising:
   an undercarriage with a plurality of pivoting links connected to each other via pivot pins, wherein one pivoting link is connected to the main frame;
   a bendable flexible track to provide a vehicle-surface interface for propelling and steering the vehicle;
   a plurality of idler wheels which engage the track and are connected to the undercarriage; and
   a plurality of bogie wheels which engage the track and are connected to the undercarriage.

20. The system of claim 19, wherein the bendable flexible track comprises:
   a plurality of cleats to engage the ground surface and shaped and positioned so that the track can bend and flex as it travels around the idler wheels and under the bogie wheels and with each cleat including a guide lug to engage the idler wheels and bogie wheels; and
   a flexible tension member axially rigid and bendably flexible in all other directions rigidly attached to the guide lugs of the cleats to hold the plurality of cleats together in a circular track.

21. The system of claim 19, wherein the track is driven by one of the idler wheels.

22. A track to act as a vehicle-surface interface for a steerable track system with a plurality of pivoting links for turning and a plurality of idler and bogie wheels for the track to travel around, the track comprising:
   a central flexible tension member axially rigid and bendably flexible in all other directions to guide the track around the plurality of idler and bogie wheels and allow for turning through pivoting of the links; and
   a plurality of ground engaging cleats to provide a ground engaging surface for the track, wherein each cleat is diamond shaped to allow for turning when the links pivot, and wherein each cleat is rigidly attached in a center portion of the cleat to the central flexible tension member.

23. The track of claim 22, and further comprising:
   a plurality of guide lugs attached to the plurality of cleats for engaging the plurality of idler and bogie wheels and ensuring the track stays in a central position to act as a vehicle-surface interface.

24. A steerable track system for propelling a vehicle with a main frame relative to a surface, the system comprising:
   an undercarriage with pivoting links connected to the main frame;
   a track to provide a vehicle-surface interface for propelling the vehicle;
   a plurality of idler wheels which engage the track and are connected to the undercarriage;
   a plurality of bogie wheels which engage the track and are connected to the undercarriage;

a drive sprocket to engage and drive the track around the idler wheels and the bogie wheels causing the vehicle to move in relation to the ground; and a suspension system with a plurality of suspension devices and suspension links, wherein the suspension devices flexibly mount to the suspension links and wherein the suspension system further comprises one or more additional suspension devices to increase a downward force on one or more bogie wheels or idler wheels when slippage is detected;

wherein the track is bendable and flexible and further comprises:
  a plurality of cleats shaped and positioned so that the track can bend and flex as it travels around the idler wheels, the bogie wheels and the drive sprocket and allow for turning when the links pivot, and with each cleat including a guide lug to engage the idler wheels, bogie wheels and drive sprocket; and
  a flexible tension member to engage the guide lugs of the cleats to hold the plurality of cleats together in a circular track.

25. The system of claim 24, wherein the plurality of idler wheels and bogie wheels flexibly attach to suspension links so that the plurality of idler wheels and bogie wheels can oscillate about the longitudinal axis of the flexible tension member.

26. The system of claim 24, wherein the drive sprocket is able to move to increase or decrease tension on the track traveling around the idler wheels, the bogie wheels and the drive sprocket.

27. The system of claim 24, wherein each track cleat is in a diamond shape.

28. The system of claim 24, wherein the pivoting links can be controlled by the steering system to pivot some or all links causing the vehicle to turn.

29. A steerable track system for propelling a vehicle with a main frame relative to a surface, the system comprising:
  an undercarriage with pivoting links connected to the main frame;
  a track to provide a vehicle-surface interface for propelling the vehicle;
  a plurality of idler wheels which engage the track and are connected to the undercarriage;
  a plurality of bogie wheels which engage the track and are connected to the undercarriage;
  a drive sprocket to engage and drive the track around the idler wheels and the bogie wheels causing the vehicle to move in relation to the ground; and
  a suspension system with a plurality of suspension devices and suspension links, wherein the suspension devices flexibly mount to the suspension links and wherein the suspension system further comprises one or more additional suspension devices to increase a downward force on one or more bogie wheels or idler wheels, wherein downward force is increased on the idler wheels to cause them to carry more vehicle weight;

wherein the track is bendable and flexible further comprises:
  a plurality of cleats shaped and positioned so that the track can bend and flex as it travels around the idler wheels, the bogie wheels and the drive sprocket and allow for turning when the links pivot, and with each cleat including a guide lug to engage the idler wheels, bogie wheels and drive sprocket; and
  a flexible tension member to engage the guide lugs of the cleats to hold the plurality of cleats together in a circular track.

30. The system of claim 29, wherein the plurality of idler wheels and bogie wheels flexibly attach to suspension links so that the plurality of idler wheels and bogie wheels can oscillate about the longitudinal axis of the flexible tension member.

31. The system of claim 29, wherein the drive sprocket is able to move to increase or decrease tension on the track traveling around the idler wheels, the bogie wheels and the drive sprocket.

32. The system of claim 29, wherein each track cleat is in a diamond shape.

33. The system of claim 29, wherein the pivoting links can be controlled by the steering system to pivot some or all links causing the vehicle to turn.

34. A steerable track system for propelling a vehicle with a main frame relative to a surface, the system comprising:
  an undercarriage with pivoting links connected to the main frame;
  a track to provide a vehicle-surface interface for propelling the vehicle;
  a plurality of idler wheels which engage the track and are connected to the undercarriage;
  a plurality of bogie wheels which engage the track and are connected to the undercarriage;
  a drive sprocket to engage and drive the track around the idler wheels and the bogie wheels causing the vehicle to move in relation to the ground; and
  a plurality of projections around the circumference of each idler wheel, bogie wheel and the drive sprocket to transfer vehicle weight to the entire surface area of each cleat as it travels around the idler wheels and under the bogie wheels and in moving the vehicle in relation to the ground;

wherein the track is bendable and flexible and further comprises:
  a plurality of cleats shaped and positioned so that the track can bend and flex as it travels around the idler wheels, the bogie wheels and the drive sprocket and allow for turning when the links pivot, and with each cleat including a guide lug to engage the idler wheels, bogie wheels and drive sprocket; and
  a flexible tension member to engage the guide lugs of the cleats to hold the plurality of cleats together in a circular track.

35. The system of claim 34, wherein each idler wheel and bogie wheel have two symmetrical halves tapered to receive the guide lugs.

36. The system of claim 34, and further comprising:
  a suspension system with a plurality of suspension devices and suspension links, wherein the plurality of idler wheels and bogie wheels flexibly attach to suspension links so that the plurality of idler wheels and bogie wheels can oscillate about the longitudinal axis of the flexible tension member.

37. The system of claim 36, wherein the suspension devices flexibly mount to the suspension links, and wherein the suspension system further comprises one or more additional suspension devices to increase a downward force on one or more bogie wheels or idler wheels.

38. The system of claim 34, wherein each track cleat is in a diamond shape.

39. The system of claim 34, wherein the pivoting links can be controlled by the steering system to pivot some or all links causing the vehicle to turn.

* * * * *